United States Patent [19]

Dominquez-Montes

[11] Patent Number: 5,357,368
[45] Date of Patent: Oct. 18, 1994

[54] SCREEN FOR THE REPRODUCTION OF THREE-DIMENSIONAL STATIC OR MOVING IMAGES, AND METHOD OF MANUFACTURING IT

[76] Inventor: Juan Dominquez-Montes, Comunidad de Canarias No. 68, 28230 Las Rozas, Madrid, Spain

[21] Appl. No.: 598,694
[22] PCT Filed: Apr. 23, 1990
[86] PCT No.: PCT/ES90/00013
§ 371 Date: Dec. 3, 1990
§ 102(e) Date: Dec. 3, 1990
[87] PCT Pub. No.: WO90/16009
PCT Pub. Date: Dec. 27, 1990

[30] Foreign Application Priority Data

Jun. 21, 1989 [ES] Spain ................................. P8902155

[51] Int. Cl.$^5$ ............................................. G03B 21/60
[52] U.S. Cl. ................................................... 359/454
[58] Field of Search ........................... 359/454–456, 359/458; 353/7; 352/57

[56] References Cited

U.S. PATENT DOCUMENTS 3,409,351 11/1968 Winnek ....................... 353/7
4,078,854 3/1978 Yano ........................... 350/128

FOREIGN PATENT DOCUMENTS 0273845 7/1988 European Pat. Off. .
750156 5/1933 France .
1481963 4/1967 France .
88592 7/1958 Netherlands .

OTHER PUBLICATIONS

International Search Report.

*Primary Examiner*—Richard A. Wintercorn
*Attorney, Agent, or Firm*—Ladas & Parry

[57] ABSTRACT

Improved screen for the reproduction of three-dimensional images, static or moving, and a method for manufacturing it. The screen is characterized in that the frames of cylindrical lenses are optically convergent and/or divergent; both frames of cylindrical lenses are formed by cylinders of semi-circular cross-section, juxtaposed in their axial direction, and are arranged on one or both faces of the screen, with the possibility of checking A) that the angle alpha between the two frames is equal to 90°, the frame of vertical cylindrical lenses then being covered by a transparent substance with a refractive index n'; or b) that this angle is less than 90°; or c) that this angle alpha is less than 90°, and that the frames of cylindrical lenses are covered with a substance with a refractive index n''. The method involves: a) preparing a first mould; b) producing a counter-mould; c) producing a final mould; and d) moulding the frames by pressing with the final mould.

16 Claims, 5 Drawing Sheets

SCREEN FOR THE REPRODUCTION OF THREE-DIMENSIONAL STATIC OR MOVING IMAGES, AND METHOD OF MANUFACTURING IT

SCOPE OF THE INVENTION

This invention relates to an improved screen for the reproduction of three-dimensional static or moving images, and to a method for manufacturing it.

As will be explained, this screen improves the operation of the optical system for reproducing three-dimensional images by projection, a system developed by the same applicant and inventor as that of this invention, and claimed in previous patent records.

ANTECEDENTS OF THE INVENTION

In the Spanish patent, publication number 20000293 (corresponding to application 8603612, submitted on Dec. 29, 1986), as well as in Spanish patent application 8900722, submitted on Feb. 28, 1989, an optical system or device is described and claimed for reproducing three-dimensional, static or moving images. This device or system includes a screen by means of which (or in which) the images are projected, the optical effect of images in relief, static or moving, being obtained.

Among the systems capable of reproducing moving images in depth, a distinction is made between stereoscopic and three-dimensional images. The term "stereoscopic" is used to describe a system in which use is made, for the reproduction of two images captured at a distance which is approximately equal to the distance between the eyes of a human being. The term "three-dimensional" is used when a greater number of captured, reproduced images is used than that used in the previous system, allowing observation within a wide angle of vision, without disturbing the observers, providing them with optical filters or any other device.

Most of the three-dimensional reproduction devices so far constructed use a "diffusing surface" where the different images are generated, projected, transmitted, amplified, or simply imprinted.

The differentiation between the different images reproduced on the diffusing surface is achieved by reserving a different place for each of them, i.e. by means of what is called "scale differentiation of images".

All systems which contain a diffusing surface reserve for each image, employing different methods, a different position on it. This position establishes a very narrow vertical strip. The vision is produced by means of an optical grid of vertical cylindrical lenses whose focal lines are contained in a plane in which the diffusing surface is located.

The angle of orthoscopic vision coincides with the angle of opening of the cylindrical lenses mentioned.

For this reason the systems which are based on this scale differentiation of images with a high value of the angle of orthoscopic vision give rise to designs of vertical cylindrical lenses which result in highly expensive construction.

Among these systems the following may be mentioned:

The system described in U.S. Pat. No. 1,883,290, from Ives, which describes a system and its respective front projection method, a system and its respective rear projection method, as well as the different systems and orientated methods of producing a high angle of orthoscopic vision. It is deduced from a reading of this patent that the high angle of orthoscopic vision gives rise to cylindrical lenses which are very difficult to manufacture, and to a loss of quality when there is a large number of images. These difficulties, together with the brilliance due to specular reflection of the projectors in the case of frontal projection, or with the adjustment to the required accuracy in the case of rear projection, give rise to minimal practical use of the resultant products.

U.S. Pat. No. 4,078,584, from Yano, describes a device which consists essentially of two elements, a convergent optical system and a screen comprising two frames of vertical cylindrical lenses. In the first of them, corresponding to FIGS. 1 to 4 of the patent, a screen of translucent material located between the frames of vertical cylindrical lenses, the images appearing divided into fine vertical strips. In the second process, one of the frames is a frame of horizontal cylindrical lenses, but this system is considered as a simple variant of the system used for the first process, this always being based on the scale differentiation of images on a diffusing surface of translucent material. In this patent, the aperture of the cylindrical lenses has a specific fixed value, regardless of the distance between the projecting lenses, as well as the projection distance, it being clear this is based on the scale differentiation of images for a very small number of images reproduced. In fact, this system is designated in the patent as a stereoscopic reproduction system with a very small number of images (see page 1, lines 10–13), it being stated that there may be a maximum of five images (see page 5, lines 30–32) with a wide range of vision, but with the serious inconvenience that there must be observers who see the same image with both eyes, and it will be necessary to give a feeling of depth by other means, which will certainly be complicated.

Summing up, all these systems, based on the scale differentiation of images, are designed so that they attempt to present to each eye an eye taken solely by a single camera. An attempt is made to present the three-dimensional image by causing each eye to see an image captured by a different camera, and therefore located in a different place.

This applicant and inventor takes as a basis, contrary to those quoted in connection with the prior art, an angular differentiation of images.

In order to achieve this differentiation it is necessary, in addition to eliminating the diffusing surface, to obtain the reproduction of the images by a method other than that provided. In this case, only a rectangle will be seen of each image projected, a rectangle which will be different for each point of observation. The totality of rectangles, corresponding to a point of observation, will form a single image different from that corresponding to any other point of observation. Therefore the angle of orthoscopic vision may be made as wide as one wishes, without the need to alter the optical characteristics of the reproduction system, simply by increasing the number of images projected. In fact, neither the number of images projected nor the angle of orthoscopic vision determine the design of the frames of cylindrical lenses. No diffusing surface is used on the surface on which the different images must be focussed. Certainly there is an ideal plane in which the images are focussed, but this plane does not require to be materialised in any physical entity. For intellectual reasons this plane may be considered as an imaginary transparent surface.

The description will commence by defining the fundamental characteristic of this transparent surface:

"Any point of the transparent surface is converted to a photon emitting centre, the photons maintaining the same direction as the incident photon".

As a consequence of this:

Any observer, whatever his or her position, will see a single point of the projected image. This point will be the intersection with the transparent surface of the line linking the optical centre of the project to the optical centre of the observer. One point of a different image corresponds to each observation situation.

If two or more images are projected at the same time from different spatial positions on the transparent surface, the photons deriving from the different projections will maintain their direction after crossing it. The different images may be distinguished since the photons from each will emerge at a different angle from this transparent surface. This establishes the concept of "angular differentiation of images".

The only systems from among those which are known that are based on this angular differentiation of images are those considered in the aforementioned patent and patent application of the present applicant and inventor; in them is described a system for projecting three-dimensional images with a horizontal parallax, and another system for projecting three-dimensional images with a horizontal and vertical parallax, i.e. an integral system.

In order to establish this differentiation an optical frame of vertical cylindrical lenses is first of all arranged in front of the aforementioned imaginary surface, at a distance which is equal to the focal length of these lenses. This focal length is selected so that the ratio of the transversal size of one of the cylindrical lenses to its focal length is at least equal to the ratio of the distance between two adjacent projecting lenses to the projection distance, and never more than twice this value.

By means of these cylindrical lenses, with the characteristics mentioned, any observer, whatever his or her position, will happen to see as many image segments as there are projectors. These segments will blend into a single rectilinear segment. This resultant rectilinear image segment will be different for each point of observation, and will be contained on the line resulting from the intersection of the plane containing the projectors and the observer with the ideal transparent projection surface.

In front of this frame is arranged a second optical frame of horizontal cylindrical lenses whose focal lines meet in the same focal plane as the vertical cylindrical lenses, and therefore coincide with the imaginary transparent screen. This second frame will have the task of converting the previous image segment to a rectangle whose base will be of the same size as the segment, and whose height will be that of the transparent surface. A different image rectangle will correspond to each observation position, and all of these rectangles will form a single, different image at each point of observation.

The focal length of these horizontal cylindrical lenses must be as short as possible in relation to their width (that of the semi-circular cylinders) in order to ensure that their aperture allows the vision, from any point, of a rectangle as high as the actual optical system.

This therefore constitutes the screen used in the previous patent and application of the present applicant. This screen is therefore formed, on one of its faces, by a surface with an optical frame consisting of horizontal cylindrical lenses with a cross-section which in practice happens to be semi-circular (i.e. the angle of the circle sector is 180°), the lenses having a transversal width of the order of 0.2 mm, and a radius of curvature of the order of 0.1 mm. The other face consists of vertical cylindrical lenses with a transversal width which is in practice of the same order of 0.2 mm, but with a much larger radius of curvature, from 1 to 2 mm, which means that the angle of the circle sector is less than 180°.

Using this screen certainly produces the surprising effects encountered for the first time by the applicant and inventor. Nevertheless, the screen suffers from one or two disadvantages. On the one hand the vertical cylindrical lenses must have a very small aperture, i.e. a large radius of curvature relative to its transversal width. This gives rise to a very small height from the base chord, making the manufacture of the corresponding frame very expensive. On the other hand, whenever the conditions of reproduction alter substantially, i.e. the size of the image reproduced, and consequently the observation distance or angle of vision, etc., it would be necessary to alter the aperture of the cylindrical lenses to obtain a perfect device. However, since the frames of the screen referred to have a fixed lens aperture, a variation in the value of this aperture would make it necessary to replace the screen by another corresponding screen adapted to this new value.

SUMMARY OF THE INVENTION

The applicant and inventor therefore set out to exploit fully the advantages of his developed systems in order to design a screen based on the angular image differentiation referred to, a screen which does not suffer from the disadvantages of the original screen, which will be called in the following the simple screen, and whose cost price is as low as possible.

In the course of the studies conducted it has been found that an improved screen is obtained by re-using the frame of vertical cylindrical lenses with small apertures with another frame of inclined cylindrical lenses of wide aperture, and/or by covering it with a transparent substance with a different refractive index. The inclination of these cylinders is variable, thereby ensuring that the horizontal aperture of the system can be adapted to all conditions of reproduction.

On the other hand, a totally new technique has been developed for manufacturing the screen cheaply and in a manner which enables it to be manufactured in series.

This improved screen, developed on this basis, is characterised in that:

the frames of cylindrical lenses are optically convergent and/or divergent (i.e. they may be presented in any combination of the optically convergent and/or divergent types considered appropriate);

the frame of horizontal cylindrical lenses is formed by cylinders of semi-circular cross-section, whilst the frame of inclined cylindrical lenses is formed by a group of semi-circular cylinders covered by a transparent substance (liquid or solid) with a refractive index n', in order to obtain, in combination with the semi-circular cylindrical lenses, the same optical aperture as that of the frame of vertical cylindrical lenses of the simple screen, the face of the frame of inclined cylindrical lenses being covered with a sheet of transparent material (which may be of plastic material, or even glass), if the substance with index n' is liquid; and/or being formed by a frame of cylindrical lenses of semi-circular cross-section which, with the horizontal cylinders on the other face, forms an angle alpha of less than 90°, this angle alpha being calculated so that the same optical aperture is obtained for the whole as for the simple screen, and so that, when the latter measurement is applied together with the covering of material of index n', the angle alpha' is greater than the angle alpha, alpha' and n' being calculated so that the same optical aperture is obtained as that of the simple screen.

Alternatively, one of the frames of cylindrical lenses may have a specular surface, the images then being reflected instead of being transmitted.

These improved screens, with their various alternatives, are used to reproduce three-dimensional images with a horizontal parallax; if the reproduction has to be of the integral type, i.e. with vertical and horizontal parallaxes, the screen is then characterised in that:

the frames of cylindrical lenses are optically convergent and/or divergent;

the frames of horizontal and vertical screens (it must be pointed out that in this case the angle alpha is always 90°) are formed by cylinders of semi-circular cross-section, juxtaposed in their axial direction, on one or both faces of the screen, the frame of vertical cylindrical lenses being covered with a substance with the refractive index required to ensure that the horizontal optical aperture mentioned is obtained, an alternative being for one of the frames to have a specular surface.

In order to manufacture the said improved screen a conceivable method would be to mould thermoplastic transparent optical materials by means of cut frames of perfectly polished cylindrical lenses. Nevertheless, bearing in mind the small dimensions of the elements comprising the screen, it may readily be understood that any conventional polishing operation will be difficult and will unacceptably alter the geometric characteristics of the mould with the said cylindrical frame.

Consequently, a totally original technique has been developed for manufacturing the improved screen, this new technique consisting in a) preparing first of all a mould consisting of perfectly polished metal wires or optical fibres, closely juxtapositioned; b) producing a counter-mould of silicone rubber or similar elastomeric material; c) producing, by galvanotechnics, a final mould, made from copper, nickel or similar material; c') occasionally, to obtain frames of optically convergent lenses, producing a counter-mould for the final mould of operation c), also made from copper, nickel or a similar metal; d) with the final mould or counter-mould, moulding by pressing the respective frames of semi-circular cylindrical lenses on the cast material intended to form the screen plate of transparent material, solidifying subsequently; or moulding the screen by applying the monomer of the thermoplastic material to the mould, and by the applying pressure under the polymerisation conditions of the monomer; and e), if a substance with a refractive index n' or n" is used on one or more frames of semi-circular cylindrical frames, applying the substance in question, and if it is liquid, covering with a film the transparent material constituting the frame, thereby enclosing the material with an index n' or n".

Convergent or divergent cylindrical optical frames may be obtained in this way with a large aperture, and these are the frames required to produce the improved screen.

The advantages obtained adopting the procedure explained above in relation to the above systems include:
A) The total angle of vision can be made as large or as small as desired, this depending solely on the number of projectors, the distance between them and on the projection distance.
B) The size of the cylindrical lenses is not limited by the number of images, and may be made as small as desired, hence the quality of the image obtained will be determined solely by the conditions of manufacture of the cylindrical lenses.
C) Pseudoscopy does not occur when the observer leaves the field of vision.
D) It is not necessary to create a complex of division of the projected images into orderly, interlace strips, nor to employ the interaction of other convergent optical systems additional to the lenticular plane. Manufacture is therefore very simple. The rear projection does not require precision adjustment, and it is very simple to implement whatever the size of the image reproduced.
E) The images observed by each eye of the observer are different, regardless of their location.
F) The system of compound cylindrical lenses of variable inclination facilitates its construction, and means that it can be used for any reproduction condition.

It should be pointed out that this system is only valid for projection, and cannot be used in photographic reproductions on paper. On the other hand it is possible to design three-dimensional slide projectors using this system.

The so-called frontal projection is obtained very easily by providing the lens frames with a specular surface as already mentioned.

BRIEF DESCRIPTION OF THE DRAWINGS

FIGS. 1 to 5 are intended to illustrate the ideas on which the new system is based, whilst FIGS. 6 and 8 describe particular embodiments of the improved system according to this invention.

In particular,

DETAILED DESCRIPTION OF THE PREFERRED EMBODIMENTS

Figure 1:
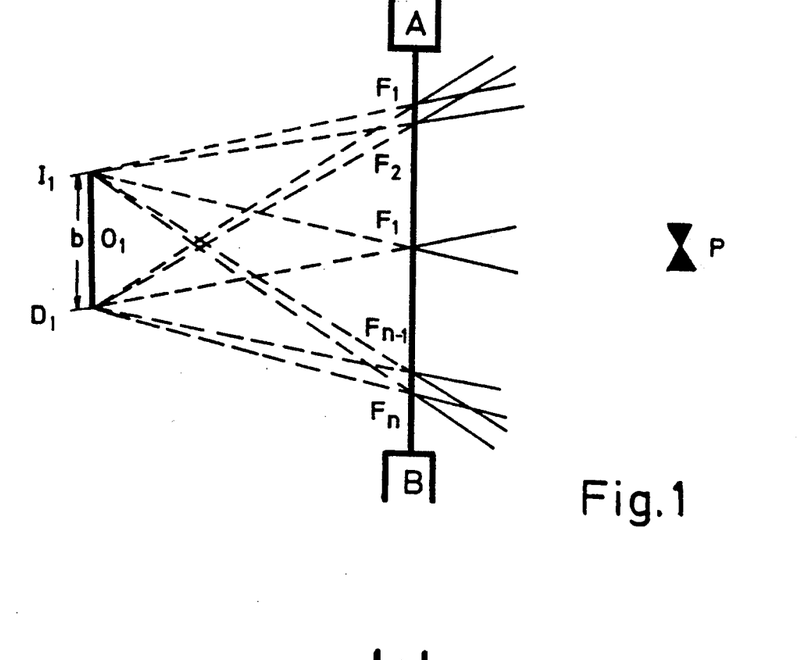
FIG. 1 shows diagrammatically an observer $O_1$, looking at an object P, through a window AB.

In FIG. 1 an observer $O_1$ is looking at an object P through a window of width AB made in a wall perpendicular to the lines of vision, ad infinitum; this observer $O_1$ is shown in plan view, with his right eye $D_1$ and left eye $I_1$; the bundle of light rays which, originating from the surrounding landscape, pass through $I_1$ (i.e. bundle homocentric at $I_1$) is that which is used to form the image of the left eye; similarly, the bundle of light rays which pass through $D_1$ (i.e. the bundle homocentric at $D_1$) is used to form the image of the right eye.

The perception of the relief is achieved when the brain synthesises the images of the left eye and of the right eye, formed by these two bundles of light rays passing through points $I_1$ and $D_1$, which do not coincide.

Straight line AB, contained within the line of the plane which contains the window, is considered to be divided into the infinitely contiguous series of points $F_1$, $F_2$... $F_i$... $F_{n-1}$, $F_n$.

It is important to point out that every ray belonging to the bundle homocentric at $D_1$ is contained within the totality of homocentric bundles $F_1$, $F_2$... $F_i$... $F_{n-1}$, $F_n$, provided that the distance between $F_i$ and $F_{i-1}$ for any value of i is sufficiently small.

Figure 2:
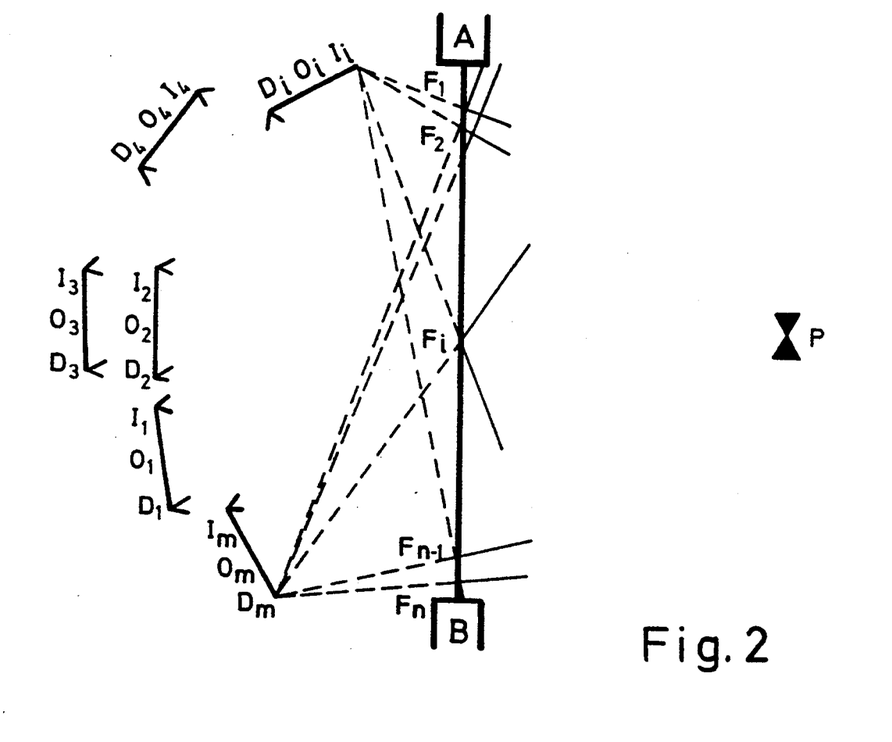
FIG. 2 shows, in diagram m, observers $O_1$, $O_2$...$O_m$, looking at an object P through window AB.

In FIG. 2, different observers $O_1$, $O_2$... $O_m$ are looking at the same object through the aforementioned window AB, and are located at different points; since it is not necessary to consider the vertical parallax, all the pairs of eyes may be represented, for their projection, in a common horizontal plane.

It is evident, for obvious topological reasons, that every homocentric bundle $I_i$ or $D_i$ is contained in the series of homocentric bundles $F_1$, $F_2$, $F_i$... $F_{n-1}$, $F_n$, provided that the distance between $F_i$ and $F_{i-1}$ is sufficiently short.

Expressed in different terms:

"The image formed, taking as a basis the homocentric bundles $I_i$ or $D_i$ corresponding to the left and right eyes of observer $O_i$, and for any observer $O_i$, may be synthesised by selecting and suitably composing fragments of the images formed taking as a basis the homocentric bundles $F_1$, $F_2$... $F_i$... $F_{n-1}$, $F_n$, provided that the distance between each $F_i$ and $F_{i-1}$ is sufficiently small".

The demonstration is still valid whatever the curve containing the homocentric bundles $F_1$, $F_2$... $F_i$... $F_n$, provided that it is continuous and passes through points AB.

The minimum separation (also called size of the reproducing elements) required not to observe that the image consists of strips, and the separation (or distance between optical centres of the lenses when the image is captured) required to be able to reproduce, in apparently continuous form, the variation of the parallax, are very different.

The maximum distance between the optical centres of the lenses of the cameras is determined, for each field depth, by the condition of continuity of image in the reproduction. These relationships are common to all systems of three-dimensional reproduction, including the system considered by this invention.

The distance between the contiguous optical centres of the projectors, when the angular image differentiation is used, is determined by the ratio of the projection aperture to the observation aperture.

The projection aperture is the quotient of the distance between the optical centres of two adjacent projectors and the projection distance.

The observation aperture is the quotient of the distance between the eyes of an observer and the observation distance.

The distance between lenses when the image is captured may be much longer than the distance $F_1$-$F_{1-1}$, mentioned above.

Therefore the capturing procedure will consist in using a series of lenses whose optical centres are located in a horizontal line, separated by a distance $K_c$ which is a function of the depth of field of capture.

Figure 3:
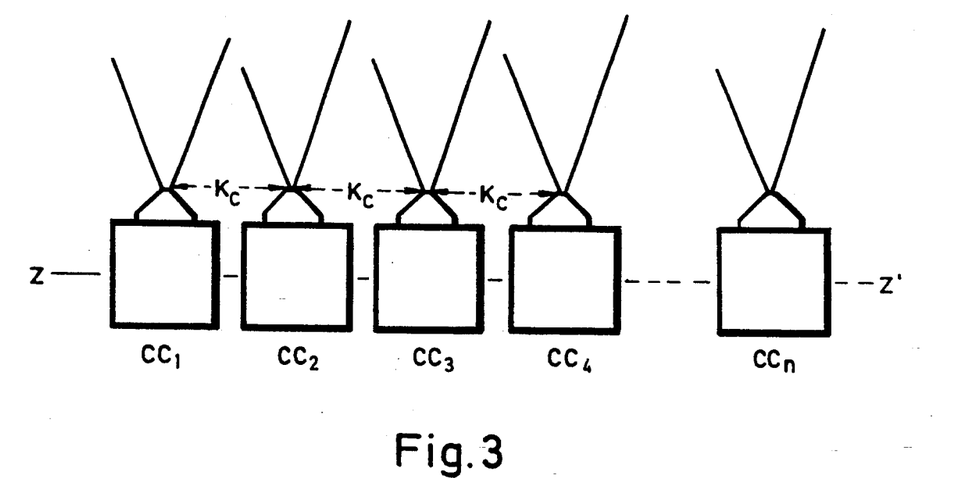
FIG. 3 shows, in diagram n, cameras $CC_1$, $CC_2$... $CC_n$ separated by a distance $K_c$, with their optical axes parallel.

FIG. 3 shows diagrammatically this capturing procedure. For simplicity of drawing each lens belonging to a single camera and the parallel optical axes between them are shown. In reality some of the lenses, or all of them, may belong to a single camera, and the optical axes may be inclined.

In this figure $CC_1$, $CC_2$, $CC_3$... $CC_n$ represent the cameras with the optical centres of their lenses separated by a distance $K_c$, located on a horizontal line ZZ'.

The same number of project will be used for the projection as the number of camera lenses used in the taking procedure. Each of them will project an image onto the transparent optical frame of cylindrical lenses.

Figure 4:
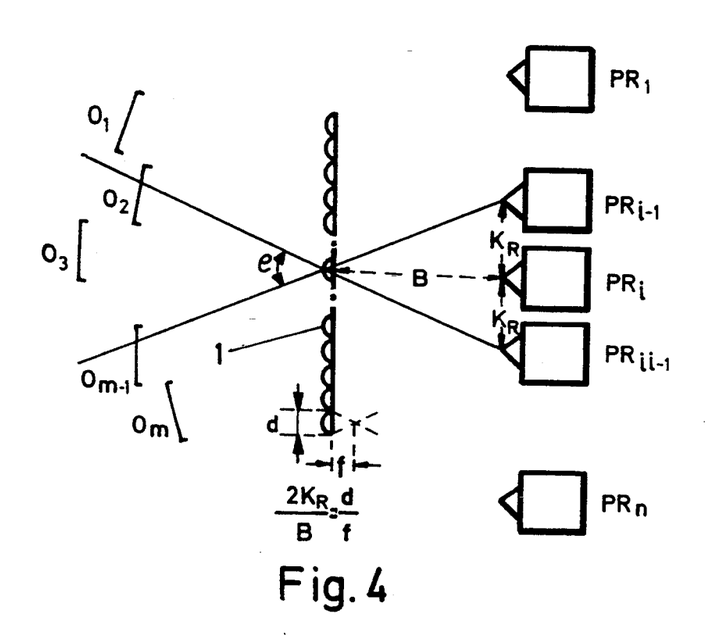
FIG. 4 shows, in diagrammatic form, the arrangement of projectors $PR_1$, $PR_2$...$PR_n$, and of the optical frame of vertical cylinders (l) with a focal length f, and a transversal size d; the distance between two adjacent projectors is $K_R$, and the projection distance is B.

FIG. 4 shows diagrammatically the arrangement of projectors $PR_1$, $PR_2$... $PR_n$, separated by distance $K_R$, and projecting on to the optical frame of cylindrical reproduction lenses.

For the sake of simplicity this figure shows each lens as belonging to a single projector, and all the optical axes are shown to be parallel with each other.

In reality, some of the lenses, or all of them, may belong to a single projector, and the optical axes may be inclined.

It is important to bear in mind that the angle formed by the different films of images in the projection must be the same as that formed by the films of the images when being captured. Otherwise the flat surfaces of the same parallax would, during capturing, be reproduced as curved surfaces, unless a compansatory inclination is introduced into the film copying process.

Distance B from the projectors to the screen is determined by the focal length of the projectors and the size of the screen or optical frame of cylindrical lenses.

The optical frame (1) of cylindrical lenses is formed by cylinders with a width d, which is sufficiently small not to be observed, reference being made to the phenomenon that, for a healthy eye, the width of the cylinders must be less than the distance of vision, in meters, divided by 3,500, and must have a focal length f given by:

$$f = B \frac{d}{2K_R}$$

which is deduced by equalising the aperture of each cylinder $G=d/f$ with that at which three projectors are seen, $(2K_R/B)$. In reality, the aperture of each cylinder may range between this value, therefore constituting the vision covering three projectors, and half of the same, i.e. constituting the vision covering two projectors. This provides an imperceptible transition from one strip of image to the next, since the image part of projector $PR_i$ is gradually blended with the projected image by its adjacent $PR_{i+1}$ and $PR_{i-1}$.

If the projectors are separated they reduce the reproduction parallax, even though the angle of three-dimensional vision increases, and vice versa.

For a given number of projectors, a different frame of cylindrical lenses corresponds to every variation in distance between them, assuming that the same projection distance is maintained, since it is necessary to establish that the ratio of the transversal size to the focal length of a cylinder is equal to the ratio of the distance between projectors to the projection distance. This disadvantage is resolved with the new improved screen of this invention.

In order to supplement the vision another optical frame of horizontal cylindrical lenses is provided, with sufficient aperture to enable any observer, regardless of his height, to see the entire vertical component of the image. Generally speaking, semi-circular cylindrical lenses, which have the maximum aperture, and with a transversal size which, as in the case of the frame of vertical cylindrical lenses, must be sufficiently small not to be observed, can always be chosen.

Figure 5:
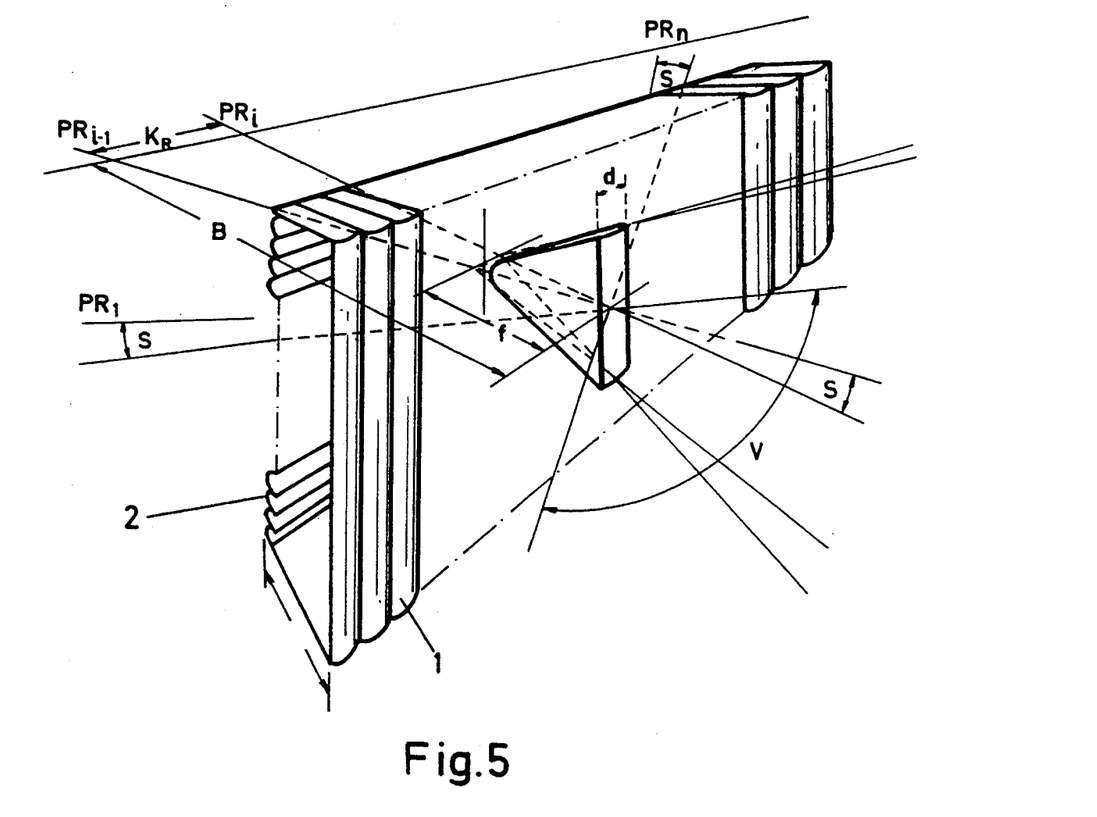
FIG. 5 shows, in perspective view, a simple screen with an optical frame of vertical cylindrical lenses (1), and an optical frame of horizontal cylindrical lenses (2), e denoting the thickness of the system, v denoting the angle of vision, S denoting the horizontal angle at which two projectors are seen, f denoting the focal length of the vertical cylinders, B denoting the projection distance, $K_R$ the distance between two adjacent projectors, and $PR_1$, $PR_2$...$PR_n$ denoting the location of the optical centres of the projectors.

The optical reproduction system is represented in FIG. 5, in which the angle of vision V is a function of the quotient of the distance separating the first projector and the last projector, the projection distance B and the aperture of the vertical cylindrical lenses; the angle S of aperture of the vertical cylindrical lenses is a function of the quotient of the distance $K_R$ between two adjacent projectors and projection distance B.

This figure also shows the vision of the vertical component through the optical frame of horizontal cylindrical lenses.

Expressing the conditions obtained numerically, for sizes of reproduced images of the order of 50 cm, a suitable observation distance of between 150 cm and 200 cm may be considered. For these values radii of curvature of the vertical cylindrical lenses of the order to several millimeters are obtained, given transversal sizes of the order of 0.2 mm which were presented for the simple screen. The height from the base chord in less than 0.005 mm. An increase in the size of the reproduced image is translated in an increase in the observation distance, and consequently in a still lower value of the height from the base chord.

In the simple screen, appreciable variations in the size of the reproduced image or in the angle of vision would obviously mean substantial variations in the conditions of reproduction, which would require replacing the screen by another with a different aperture. All these disadvantages, as already indicated, are eliminated using the improved screen, which still has an optical frame of horizontal cylindrical lenses of large aperture and of semi-circular cross-section.

The only condition for this frame of horizontal cylindrical lenses is that it has an aperture sufficient to enable the image to be seen throughout its height, from any observation position provided.

Figure 7:
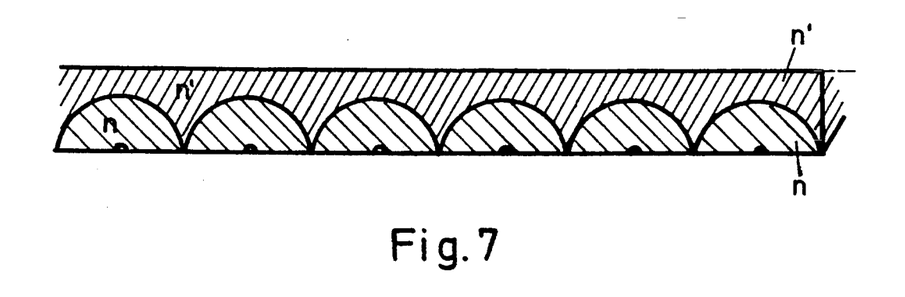
FIG. 7 shows, in transversal section, a sheet provided with the inclined cylindrical lenses, consisting of a substance with a refractive index n, covered with another substance with a flat surface, solid or liquid, with a different refractive index n'.

The frame of inclined cylindrical lenses has a vertical aperture component which varies the valve of the vertical aperture of the horizontal cylindrical lenses. This variation in the vertical opening does not alter the operation of the system because, as already mentioned, this vertical aperture is not subject to any critical value. This frame of inclined cylindrical lenses has a large aperture $G_{max}$, thereby providing considerable facility of manufacture. In FIG. 7 these cylinders have been represented as semi-circular. The angle alpha which these cylindrical lenses form with the horizontal is determined on the basis of the value G of the horizontal aperture component, which is the component provided to reproduce the horizontal parallax. The ratio sin alpha$=G/G_{max}$ is compiled with.

The vertical aperture component, whose value is $G_{max} \cdot \cos\text{ alpha}$, is combined with the component provided by the vertical aperture of the horizontal cylinders without in any way affecting the optical operation of the system.

Figure 6:
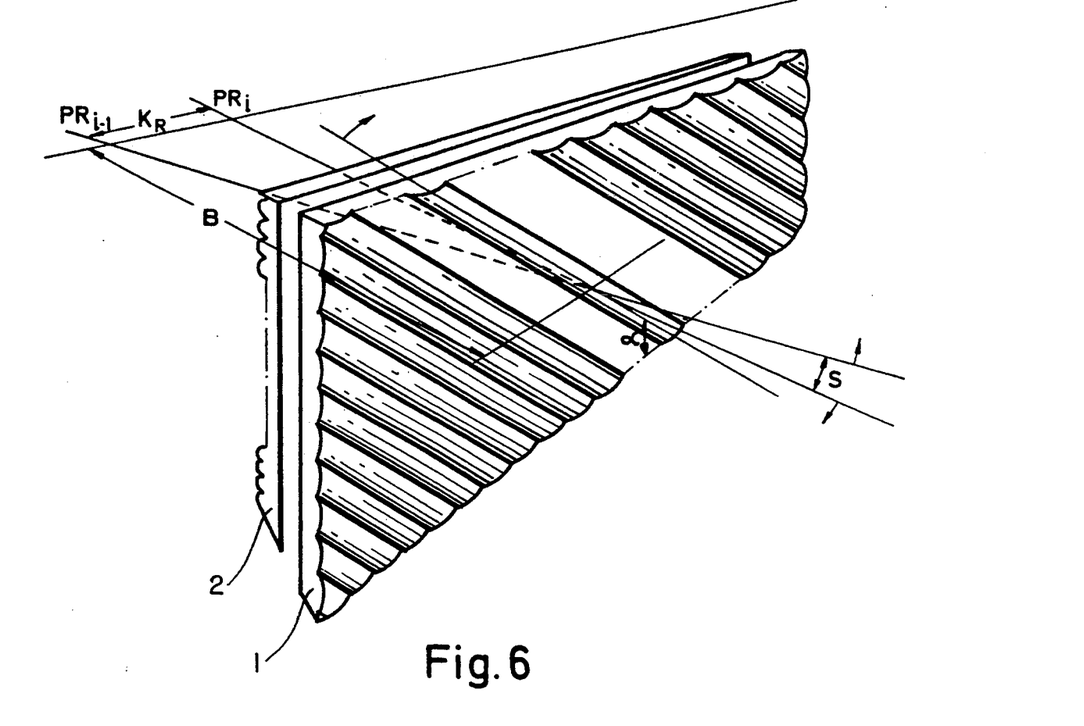
FIG. 6 shows a perspective view of the improved screen according to this invention, provided with a screen with horizontal cylindrical lenses on one side, and a flat rear section, and with another sheet of cylindrical lenses inclined at an angle alpha to the horizontal, on one side, and a rear section, also flat; both rear sections face each other.

It is important to point out that the variation in this inclination alpha between 0° and 90° will establish the corresponding variation in the resultant horizontal aperture between 0 and $G_{max}$. It is deduced from this condition that the resultant optical system, which is represented in FIG. 6, is suitable for any reproduction condition, provided that a horizontal aperture between these values of 0 and $G_{max}$ is present.

Returning to FIG. 6, this shows, by means of arrows, the direction of the variation in the angle alpha and the resultant of the variation in the angle S between two projectors $PR_{i-1}$ and $PR_i$. In most cases, as already mentioned, the horizontal component G is very small, and as a result the angle alpha is also small. Nevertheless, under these conditions, the "moire" effect may be observed, but is rendered imperceptible when the values of the angle alpha are increased.

To increase this angle alpha without losing the advantage of the suitable manufacture of the cylinders with a sufficient aperture $G_{max}$ a screen of the compound type must be used, i.e. with materials of different refractive indices. In this screen the aperture $G'_{max}$ is made substantially less than $G_{max}$.

Figure 8:
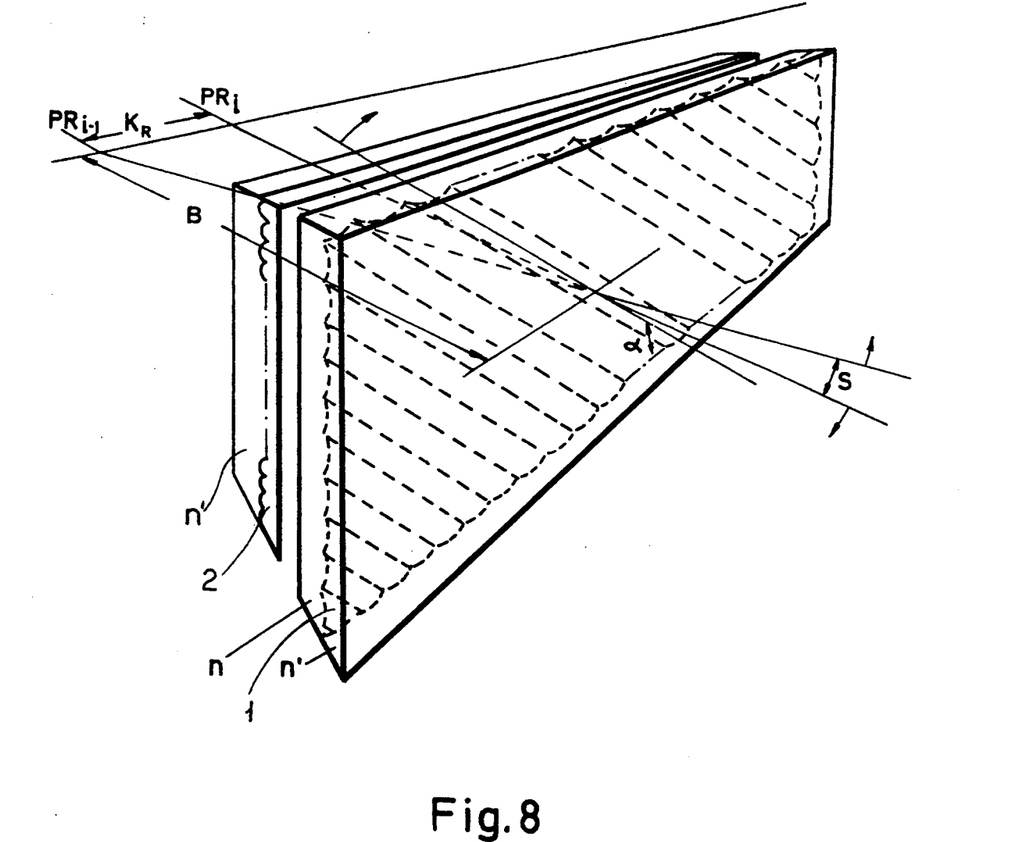
FIG. 8 shows, in a perspective view, the improved screen, object of this invention, provided with a sheet of horizontal single cylindrical lenses, and with another sheet of inclined cylindrical lenses, at a variable angle alpha to the horizontal, covered with a substance having a refractive index n'.

FIG. 7 shows a tranversal section of one of these frames of inclined cylindrical lenses of the compound type. The cylinders are made from a material with a refractive index n covered with a coating of a material (solid or liquid) with a flat outer face and a refractive index n'. The aperture of this compound system will be $G'_{max}=G_{max}(n-n')/n-1$. The resultant optical system is shown in FIG. 8 in a perspective view. Again this figure shows the direction of the variation in the angle alpha and the resultant direction of the variation in angle S. The aperture of this system is given by:

$$G = G_{max} \cdot \sin\alpha \frac{n - n'}{n - 1}$$

In the above description reference has always been made to convergent cylindrical lenses, which have been represented in the figures, but the system is also applicable to the case where the lenses are divergent, or where there is a combination of divergent with convergent lenses, with the sole restriction that the aperture values and the values of the transversal dimensions of the optical component elements be maintained.

I claim:

1. A projection screen for reproducing three-dimensional images with a horizontal parallax, said images being captured from a plurality of different horizontally aligned points and being projected onto the screen by the same plurality of different horizontally aligned projection lenses, the screen comprising, a transparent sheet of parallel horizontal cylindrical lenses (2) and, another transparent sheet of parallel other cylindrical lenses (1), the sheets being substantially parallel to each other, the transversal size of the other cylindrical lenses (1) being so small that they cannot be perceived and a resultant horizontal aperture (G) of the other cylindrical lenses (1) is greater than a value obtained when the distance between two adjacent projection lenses is divided by the projection distance and less than twice this value, the transversal size of the horizontal cylindrical lenses (2) also being so small that they cannot be perceived, the cylindrical lenses (1, 2) having semi-circular cross sections and a common focal plane, wherein at least one (a) the cylindrical lenses (1, 2) are covered by a transparent substance with a refractive index (n') different from the refractive lens index (n) of the cylindrical lenses (1, 2) in order to decrease the resultant horizontal aperture (G), the refractive index (n') being determined so that the resultant horizontal aperture (G) is obtained, and (b) the other cylindrical lenses (1) are arranged at an angle alpha with respect to the horizontal cylindrical lenses (2) which angle alpha is greater than 0° and smaller than 90°, said angle alpha being determined so that the resultant horizontal aperture (G) is obtained.

2. A projection screen according to claim 1, characterised in that the cylindrical lenses (1, 2) are optically convergent.

3. A projection screen according to claim 1, characterised in that the cylindrical lenses (1, 2) are optically divergent.

4. A projection screen according to claim 1, characterised in that some of the cylindrical lenses (1, 2) are optically convergent while the others are optically divergent.

5. A projection screen according to claim 1 with the cylindrical lenses (1, 2) being covered by a transparent substance, characterised in that said angle alpha is equal to 90°, so that the other cylindrical lenses (1) are vertical.

6. A projection screen according to claim 1, characterised in that one of the sheets further comprises a reflective surface.

7. A projection screen according to claim 2, with the cylindrical lenses (1, 2) being covered by a transparent substance, characterised in that said angle alpha is equal to 90°, so that the other cylindrical lenses (1) are vertical.

8. A projection screen according to claim 3, with the cylindrical lenses (1, 2) being covered by a transparent substance, characterised in that said angle alpha is equal to 90°, so that the other cylindrical lenses (1) are vertical.

9. A projection screen according to claim 4, with the cylindrical lenses (1, 2) being covered by a transparent substance, characterised in that said angle alpha is equal to 90°, so that the other cylindrical lenses (1) are vertical.

10. A projection screen according to claim 2, characterised in that one of the sheets further comprises a reflective surface.

11. A projection screen according to claim 3, characterised in that one of the sheets further comprises a reflective surface.

12. A projection screen according to claim 4, characterised in that one of the sheets further comprises a reflective surface.

13. A projection screen according to claim 5, characterised in that one of the sheets further comprises a reflective surface.

14. A projection screen according to claim 7, characterised in that one of the sheets further comprises a reflective surface.

15. A projection screen according to claim 8, characterised in that one of the sheets further comprises a reflective surface.

16. A projection screen according to claim 9, characterised in that one of the sheets further comprises a reflective surface.

* * * * *

UNITED STATES PATENT AND TRADEMARK OFFICE
CERTIFICATE OF CORRECTION

PATENT NO.  : 5,357,368
DATED       : October 18, 1994
INVENTOR(S) : Juan Dominguez Montes It is certified that error appears in the above-indentified patent and that said Letters Patent is hereby corrected as shown below:

Title page, item [76], Inventor:   should read--Dominguez--.

Signed and Sealed this

Third Day of January, 1995

Attest:

BRUCE LEHMAN

*Attesting Officer*    *Commissioner of Patents and Trademarks*